(12) United States Patent
Maeda (10) Patent No.: US 6,713,778 B2
(45) Date of Patent: Mar. 30, 2004

(54) REGISTER SETTING METHOD AND SEMICONDUCTOR DEVICE

(75) Inventor: Teruaki Maeda, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/079,891

(22) Filed: Feb. 22, 2002

(65) Prior Publication Data

US 2002/0171075 A1 Nov. 21, 2002

(30) Foreign Application Priority Data

May 17, 2001 (JP) .................................... 2001-147400

(51) Int. Cl.[7] .............................................. H01L 29/06
(52) U.S. Cl. .................... 257/10; 710/130; 710/173; 710/306; 711/1; 711/2; 711/202; 365/222; 365/236
(58) Field of Search .......................... 710/130; 711/173, 711/1, 2, 202; 365/222, 230.06, 236

(56) References Cited

U.S. PATENT DOCUMENTS 6,240,482 B1 * 5/2001 Gates et al. ................ 710/306

* cited by examiner

*Primary Examiner*—David Nelms
*Assistant Examiner*—Mai-Huong Tran
(74) *Attorney, Agent, or Firm*—Arent Fox Kintner Plotkin & Kahn, PLLC

(57) ABSTRACT

A register setting method which facilitates writing of change information into a register for storing operation condition information that defines the operation of a device. The method includes the steps of storing first operation condition information in a first register, storing second operation condition information in a second register, changing the first operation condition information, and when the first operation condition information is changed, changing the second operation condition information to changed first operation condition information in accordance with change information for changing the first operation condition information.

14 Claims, 9 Drawing Sheets

REGISTER SETTING METHOD AND SEMICONDUCTOR DEVICE

BACKGROUND OF THE INVENTION

The present invention relates to a register setting method, and more particularly, to a method of setting a resistor for storing data for controlling a variety of operational specifications of a device, and a semiconductor device.

A semiconductor device typically has a large number of operation modes so that an optimal operation mode for a user's system is set in the semiconductor device. The semiconductor device comprises a mode register for storing an operation mode setting value. The semiconductor device operates based on the operation mode setting value stored in the mode register.

The mode register setting value is generally supplied from an external device in response to a mode register set (MRS) command. The MRS command is a command for initially setting the operation mode of the semiconductor device. The MRS command is supplied from a system in response to a power-on of the system or a released reset signal associated with a system reset. More specifically, in accordance with the MRS command, the mode register in the semiconductor device stores set values for operation conditions (hereinafter called the "operation condition information"), for example, a CAS latency (2 clocks, 3 clocks, or 4 clocks), an addressing mode (sequential mode or interleave mode), burst (burst length: 0, 2, 4, or 8), and the like.

Figure 1:
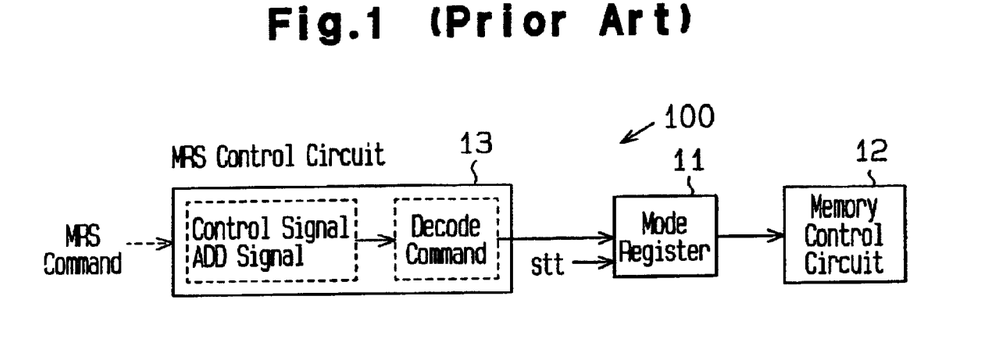
FIG. 1 is a schematic block circuit diagram of a semiconductor device according to a first prior art example.

FIG. 1 is a schematic block circuit diagram of a semiconductor device 100 according to a first prior art example.

The semiconductor device 100 is, for example, an EEPROM or a flash memory, i.e. a non-volatile semiconductor memory device. A mode register 11 stores a previously set initial value for the operation condition information (hereinafter called the "default value") as the semiconductor device 100 is powered on. The default value is set by a ROM which stores information, for example, by cutting a predetermined element with a laser, or by a latch circuit which is set to have a constant value by a power supply. The mode register 11, in response to a start signal stt, supplies a memory control circuit 12 with a control signal including the stored default value. The memory control circuit 12, in response to the control signal, controls peripheral circuits (for example, an input/output circuit). The semiconductor device 100 operates in accordance with the default value.

A MRS control circuit 13 generates a set signal in response to a MRS command, and supplies the set signal to the mode register 11. The MRS command is specified by a combination of levels of a plurality of control signals. Specifically, when a command generated by decoding a plurality of control signals is an MRS command, the MRS control circuit 13 supplies the mode register 11 with a set signal based on an address (ADD) signal. The mode register 11 stores a variety of set values in response to the set signal, and generates a memory control signal in accordance with the set values, and supplies a memory control signal to the memory control circuit 12. In this event, the semiconductor device 100 operates in accordance with newly set operation condition information.

Figure 2:
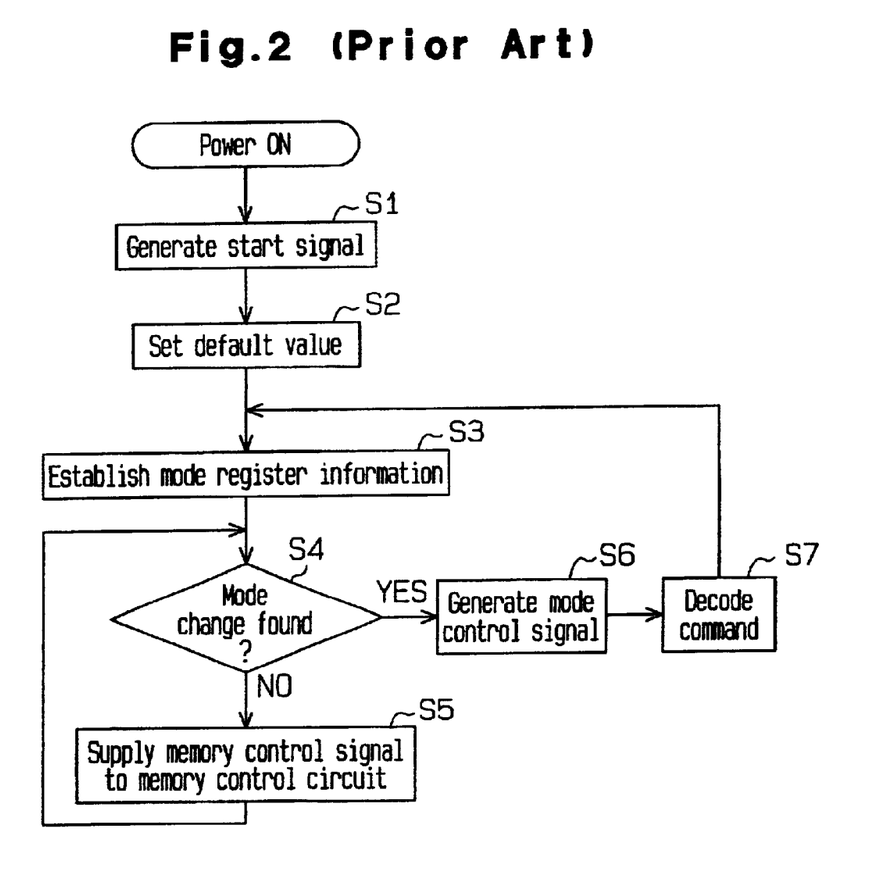
FIG. 2 is a diagram for explaining a sequence of operations performed by the semiconductor device in FIG. 1.

FIG. 2 is a diagram illustrating a sequence of operations in the first prior art example including the user's system.

As the device 100 is powered on, a start signal stt is generated within the device 100 (step S1), and the mode register 11 is set to a default value (step S2). At this time, information in the mode register 11 is established (step S3).

Next, it is determined whether or not an operation condition (mode) has been changed (step S4). When the operation condition is not changed, the mode register 11 supplies a memory control signal to the memory control circuit 12 (step S5). In response to the memory control signal, the memory control circuit 12 operates, causing the device 100 to perform an operation such as read/write.

Afterwards, the mode register 11 is rewritten by an MRS command for adapting the operational specifications of the device to system's operational specifications on the user side. When the operation condition is changed, a mode control signal is generated (step S6), and the MRS control circuit 13 decodes a command to generate a register set signal which is supplied to the mode register 11 (step S7). Thus, new operation condition information is set in the mode register 11 (step S3).

The mode register 11 is a memory having a fast write and read operation so that its setting can be immediately changed, and is typically implemented by a volatile memory. Therefore, a set value must be written into the mode register 11 by an external device each time a system, equipped with the semiconductor device 100 including the mode register 11, is powered on or reset. The rewriting results in a longer start-up time from power supply to the device to the actual operation of the device adapted to new specifications.

Figure 3:
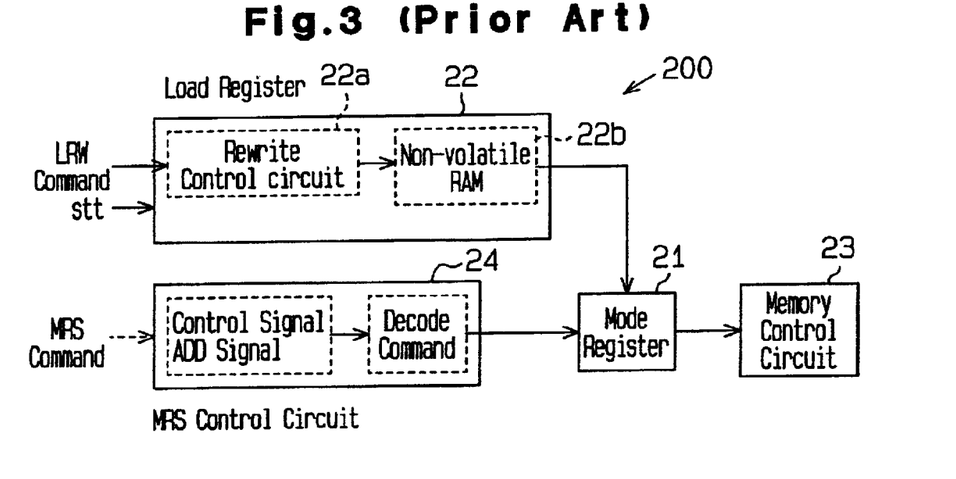
FIG. 3 is a schematic block circuit diagram of a semiconductor device according to a second prior art example.

FIG. 3 is a schematic block circuit diagram of a semiconductor device 200 according to a second prior art example.

The semiconductor device 200 includes a load register 22 for transferring a set value (operation condition information) to a mode register 21. The load register 22 has a rewrite control circuit 22a and a non-volatile RAM 22b. The control circuit 22a receives a rewrite command (LRW command: Load Register Write command) from an external device. The control circuit 22a rewrites the contents of the non-volatile RAM 22b in response to the LRW command.

The load register 22, in response to a start signal stt, transfers the set value stored in the non-volatile RAM 22b to the mode register 21. The mode register 21 generates a memory control signal in accordance with the set value, and supplies the memory control signal to a memory control circuit 23.

Since the semiconductor device 200 includes the non-volatile RAM 22b of the load register 22, the set value does not need to be set again in the mode register 21 each time the system is powered on or the system is reset.

Figure 4:
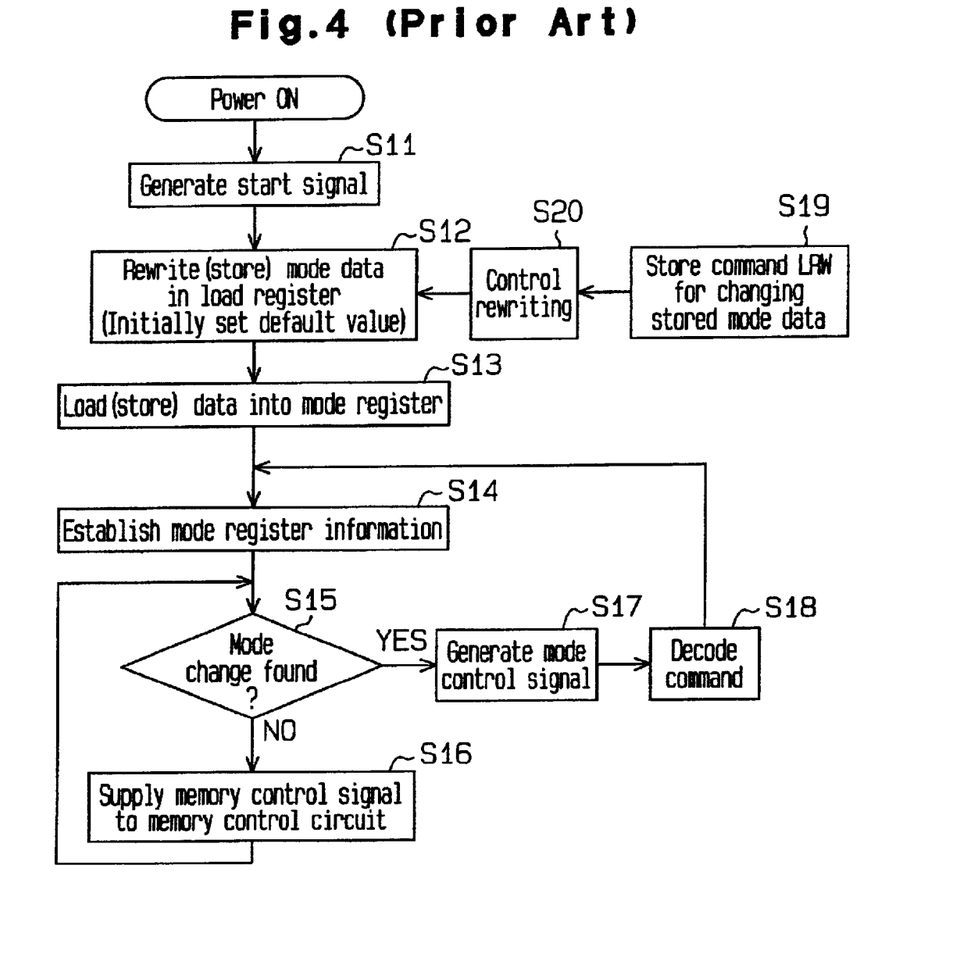
FIG. 4 is a diagram for explaining a sequence of operations performed by the semiconductor device in FIG. 3.

FIG. 4 is a diagram illustrating a sequence of operations in the second prior art example.

As the device 200 is powered on, a start signal stt is generated within the device 200 (step S11), and an initial value is set in the load register 22 in response to the start signal stt (step S12). The load register 22 loads the initial value into the mode register 21 (step S13) to establish initial information in the mode register 21 (step S14).

Next, it is determined whether or not the operation condition (mode) has been changed (step S15). When the mode is not changed, the mode register 21 supplies a memory control signal to the memory control circuit 23 (step S16). The memory control circuit 23 operates in response to the memory control signal, causing the device to perform an operation such as read/write.

Afterwards, the mode register 21 is rewritten by an MRS command for adapting the operational specifications of the device to the system's operational specifications of the user. When the mode is changed, a mode control signal is generated (step S17). An MRS control circuit 24 decodes a command to generate a register set signal which is supplied to the mode register 21 (step S18). At this time, new operation condition information is set in the mode register 21 (step S14).

As the device 200 is once shut off, the set value (initial value) of the mode register 21, after the device 200 is again powered on is loaded again from the load register 22 and stored in the mode register 21.

When the content of the load register 22 is changed, the system generates a rewrite command (LRW command) (step S19). The rewrite control circuit 22a supplies rewrite information to the non-volatile RAM 22b in response to the LRW command (step S20) to rewrite the contents of the non-volatile RAM 22b. Therefore, when the device 200 is powered on at a later time, a new initial value is loaded into the mode register 21. The memory control circuit 23 operates in accordance with the new initial value, causing the device to perform an operation such as read/write.

In the second prior art example, the system only requires a simple program, and improves the overall performance. However, a command must be provided for supplying the load register 22 with register information. This increases the program control step on the system side by one. Also, in a shipment process of the system (board) on the client side, a special write must be performed into the load register 22, causing an increase in the number of steps.

Figure 5:
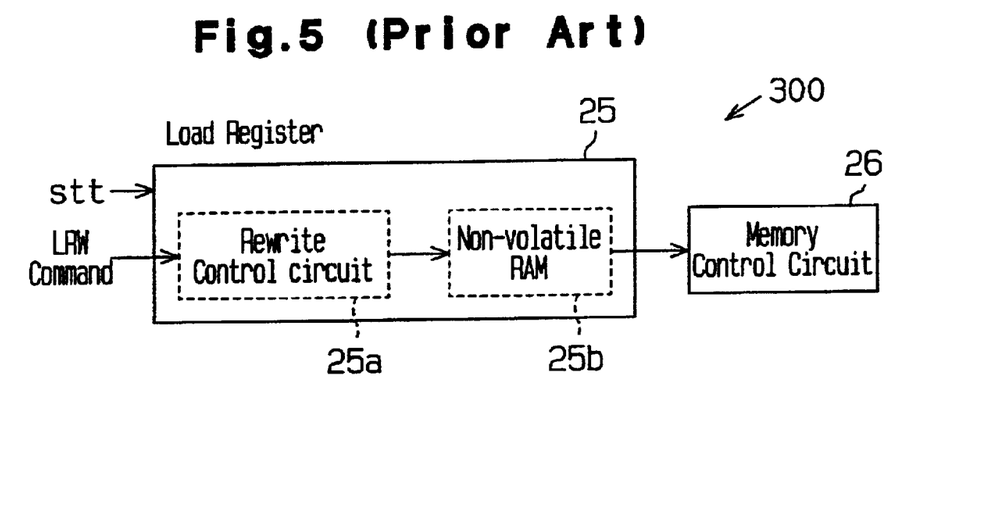
FIG. 5 is a schematic block circuit diagram of a semiconductor device according to a third prior art example.

FIG. 5 is a schematic block circuit diagram of a semiconductor device 300 according to a third prior art example.

The semiconductor device 300 includes a load register 25. The load register 25 has a rewrite control circuit 25a and a non-volatile RAM 25b. In response to a start signal stt, the load register 25 stores a register set value in the non-volatile RAM 25b to generate a memory control signal which has a register set value. The memory control signal is supplied to a memory control circuit 26.

The control circuit 25a receives an LRW command from an external device, and rewrites the contents of the non-volatile RAM 25b in response to the LRW command.

Since the semiconductor device 300 includes the non-volatile RAM 25b, the operation mode does not need to be set again when the system is powered on or reset.

Figure 6:
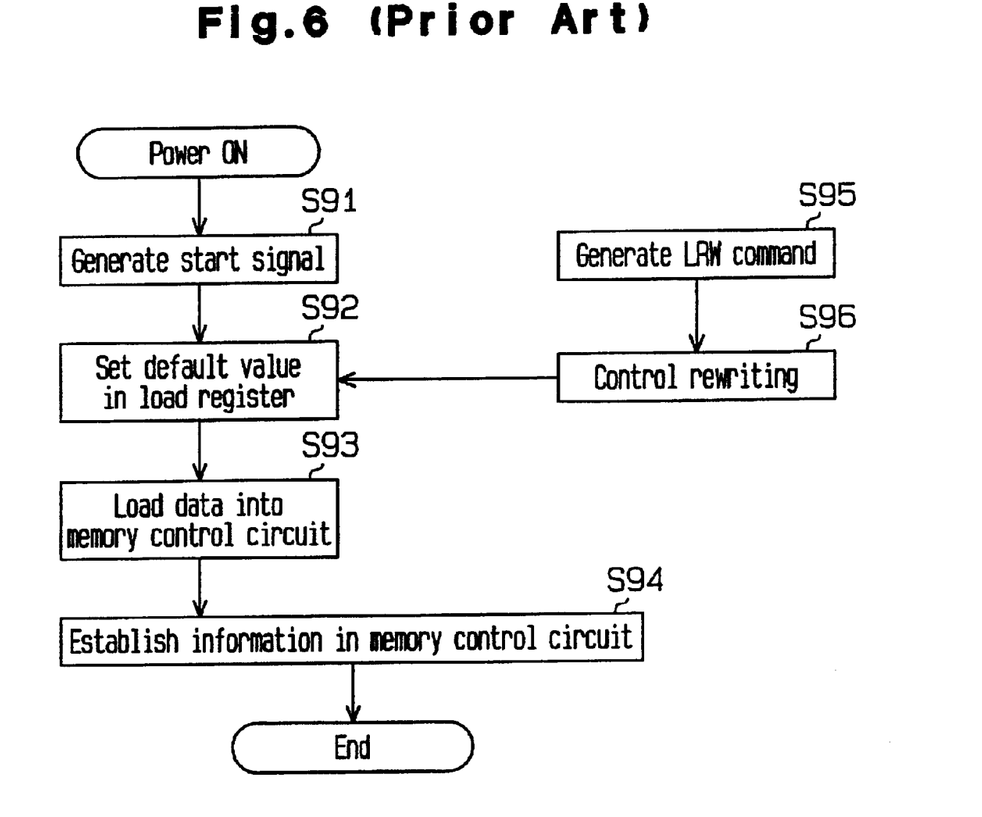
FIG. 6 is a diagram for explaining a sequence of operations performed by the semiconductor device in FIG. 5.

FIG. 6 is a diagram illustrating a sequence of operations in the third prior art example.

As the device 300 is powered on, a start signal stt is generated (step S91). In response to the start signal stt, an initial value is set in the load register 25 (step 92). The load register 25 loads the initial value to the memory control circuit 26 (step S93) to establish operation condition information in the memory control circuit 26 (step S94).

When the content of the load register 25 is changed, as the system generates a rewrite command (LRW command) for changing the stored mode data (step S95), the LRW command is supplied to the rewrite control circuit 25a of the load register 25. The control circuit 25a supplies rewrite information to the non-volatile RAM 25b in response to the LRW command (step S96) to rewrite the contents of the non-volatile RAM 25b in accordance with the rewrite information (step S92). Therefore, when the semiconductor device 300 is powered on at a later time, a set value (new initial value) written in the non-voltage RAM 25b is loaded into the memory control circuit 26. Then, the memory control circuit 26 operates in accordance with the new initial value, causing the device to perform an operation such as read/write.

In the third prior art example, the load register 25 loads the mode information in the non-volatile RAM 25b into the memory control circuit 26 in response to the start signal stt. Therefore, even if the contents of the non-volatile RAM 25b are changed by the LRW command, the start signal stt must be generated by powering again or resetting the system in order to reflect the change to the operation of the system. For this reason, the third prior art example has a problem that an extremely long time is required for changing the operation of the system.

SUMMARY OF THE INVENTION

It is an object of the present invention to provide a register setting method to facilitate writing of change information into a register which stores operation condition information that defines the operation of a system, and a semiconductor device including the register.

It is another object of the present invention to provide a register setting method and a semiconductor device which readily reflect operation condition information for the device, stored in a non-volatile memory, to a system.

To achieve the above object, the present invention provides a register setting method for setting operation condition information, which defines the operation of a device, in a first register and a second register. The method includes storing first operation condition information in the first register, storing second operation condition information in the second register, changing the first operation condition information, and when the first operation condition information is changed, changing the second operation condition information in accordance with change information for changing the first operation condition information.

A further perspective of the present invention is a register setting method for setting operation condition information, which defines the operation of a device, in a first register including a volatile memory and a second register including a non-volatile memory. The method includes storing first operation condition information in the first register, storing second operation condition information in the second register, changing the second operation condition information, and when the second operation condition information is changed, changing the first operation condition information in the first register substantially at the same time the second operation condition information is changed, in accordance with change information for changing the second operation condition information.

A further perspective of the present invention is a semiconductor device having a plurality of operation modes and adapted to operate in accordance with operation condition information which defines each operation mode. The semiconductor device includes a first register for storing first operation condition information, and a second register connected to the first register for storing second operation condition information. A device control circuit is connected to the first register for controlling the operation of the semiconductor device in accordance with the first operation condition information or the second operation condition information. When the first operation condition is changed, the second register receives a set signal including change information for changing the first operation condition information, and changes the second operation condition information to changed first operation condition information in accordance with the change information.

A further perspective of the present invention is a semiconductor device having a plurality of operation modes and adapted to operate in accordance with operation condition information which defines each operation mode. The device includes a first register for storing first operation condition information, and a change detector connected to the first register for detecting a change in the first operation condition information stored in the first register to generate a detection signal in accordance with the detected change. A second register is connected to the first register and the change detector for storing second operation condition information in response to the detection signal. A device control circuit is connected to the first register for controlling the operation of the semiconductor device in accordance with the first operation condition information or the second operation condition information. The second register receives a second register change signal including change information for changing the first operation condition information, and changes the second operation condition information to changed first operation condition information in accordance with the change information in response to the detection signal.

A further perspective of the present invention is a semiconductor device having a plurality of operation modes and adapted to operate in accordance with operation condition information which defines each operation mode. The device includes a first register including a volatile memory for storing first operation condition information, and a second register connected to the first register and including a non-volatile memory for storing second operation condition information. A device control circuit is connected to the first register and the second register for controlling the operation of the semiconductor device in accordance with the first operation condition information or the second operation condition information. When the second operation condition information is changed, the second register changes the first operation condition information in the first register to changed second operation condition information substantially at the same time the second operation condition information is changed, in accordance with change information for changing the second operation condition information.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

[First Embodiment]

Figure 7:
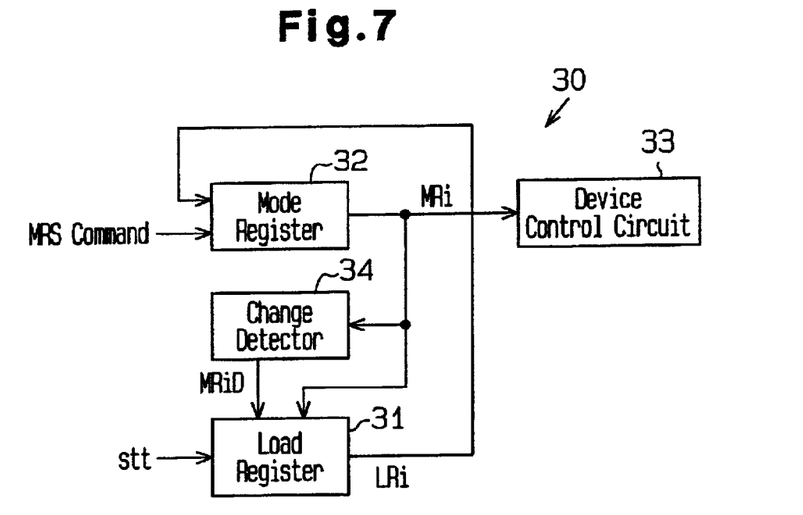
FIG. 7 is a schematic block circuit diagram of a semiconductor device according to a first embodiment of the present invention.

FIG. 7 is a schematic block circuit diagram of a semiconductor device 30 according to a first embodiment of the present invention. The semiconductor device 30 includes a load register 31, a mode register 32, a device control circuit 33, and a change detector 34.

The load register 31 includes a non-volatile RAM (not shown) which previously stores operation condition information (mode information) suitable for the operational specifications of the semiconductor device 30. The load register 31 generates a load signal LRi (i is a value indicative of a register which constitutes the load register 31) including stored mode information (set value) in response to a start signal stt generated within the semiconductor device 30 as the semiconductor device 30 is powered on, and transfers (loads) the load signal LRi to the mode register 32.

The load register 31 and mode register 32 have a plurality of registers corresponding to the type (number) of operation condition information stored therein. For example, the load register 31 and mode register 32 for storing five pieces of information have five registers, respectively. The load register 31 generates load signals LR1 to LR5 corresponding to information in the respective registers.

The mode register 32 stores the values of the transferred load signals LRi in respective registers. The mode register 32 generates a device control signal MRi (i is a value indicative of a register which constitutes the mode register 32) including the stored operation condition information, and supplies the device control signal MRi to the device control circuit 33. The device control circuit 33 controls a peripheral circuit (for example, an input/output circuit) of the device in response to the control signal MRi. Therefore, the semiconductor device 30 operates in accordance with an initial value stored in the load register 31.

The set value (operation condition information) set in the mode register 32 is changed by an MRS command from an external device. The mode register 32 receives the MRS command, and stores operation condition information added to the MRS command, or operation condition information based on another signal (for example, an address signal) when the MRS command is received. The mode register 32 generates a device control signal MRi which includes changed operation condition information, and supplies the control signal MRi to the device control circuit 33. The semiconductor device 30 operates in accordance with the operation condition information newly set in the mode register 32.

The device control signal MRi is supplied to the change detector 34 and load register 31. The change detector 23 detects rewriting of operation condition information stored in the mode register 32 in accordance with a change in the control signal MRi. The change detector 34 generates a detection signal MRiD when it detects a change in the control signal MRi, and supplies the detection signal MRiD to the load register 31.

The load register 31, in response to the detection signal MRiD, updates the operation condition information stored therein in accordance with the control signal MRi. Therefore, the load register 31 stores the same operation condition information as the changed operation condition information in the mode register 32.

When the semiconductor device 30 is powered on again, the load register 31 loads the changed operation condition information to the mode register 32 in accordance with a start signal stt. Therefore, the mode register 32 need not be set when the semiconductor device 30 is powered on again. In addition, the semiconductor device 30 eliminates an effort of duplicating the contents (operation condition information) of the mode register 32 in the load register 31 (writing the same mode information into the load register 31).

[Second Embodiment]

Figure 8:
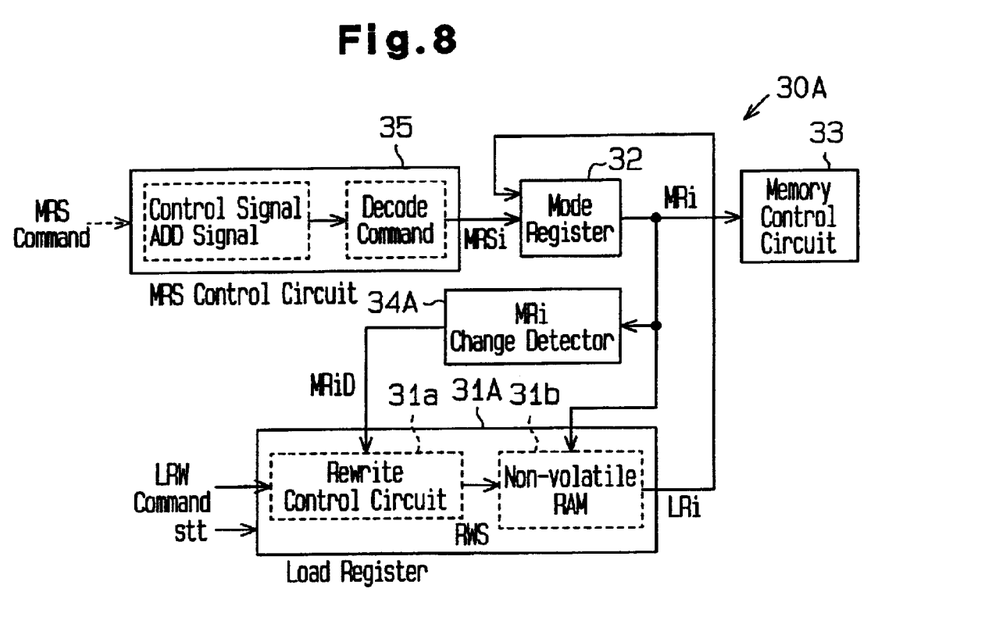
FIG. 8 is a schematic block circuit diagram of a semiconductor device according to a second embodiment of the present invention.

FIG. 8 is a schematic block circuit diagram of a semiconductor device 30A according to a second embodiment of the present invention. The semiconductor device 30A is a non-volatile semiconductor storage device such as an EEPROM or a flash memory. The semiconductor device 30A includes a load register 31A, a mode register 32, a memory (device) control circuit 33, an MRi change detector 34A, and an MRS control circuit 35.

The load register 31A includes a rewrite control circuit 31a, and a non-volatile RAM 31b. The load register 31A generates a load signal LRi including operation condition information (initial value) stored in the non-volatile RAM 31b in response to a start signal stt. The load signal LRi is supplied to the mode register 32.

The rewrite control circuit 31a is provided for rewriting the contents (operation condition information) of the non-volatile RAM 31b from an external device. The control circuit 31a receives an LRW command from an external device. The control circuit 31a, in response to the LRW command, generates a rewrite instruction signal RWS including rewrite information, and supplies the rewrite instruction signal RWS to the non-volatile RAM 31b. The rewrite information is based on information added to the LRW command, or another signal (for example, an address signal) when the LRW command is supplied. The non-volatile RAM 31b stores new operation condition information based on the rewrite instruction signal RWS. The load register 31A generates a load signal LRi including the new operation condition information, and supplies the load signal LRi to the mode register 32. The mode register 32 stores the new operation condition information when the semiconductor device 30A is powered on at a later time.

The MRS control circuit 35 receives a plurality of control signals, and decodes the plurality of control signals to generate a command. When the decoded command is an MRS command, the MRS control circuit 35 generates a set signal MRSi based on an address (ADD) signal including the operation condition information, and supplies the set signal MRSi to the mode register 32. The mode register 32 stores the operation condition information in respective registers corresponding thereto, and generates a device control signal MRi including the operation condition information. The control signal MRi is supplied to the memory control circuit 33, MRi change detector 34A, and non-volatile RAM 31b. The semiconductor device 30A operates in accordance with the newly set operation condition information.

The change detector 34A generates a detection signal MRiD when it detects a change (a change in the operation condition information) in the control signal MRi, and supplies the detection signal MRid to the load register 31A.

The rewrite control circuit 31a of the load register 31A generates a rewrite instruction signal RWS in response to the detection signal MRiD, and supplies the rewrite instruction signal RWS to the non-volatile RAM 31b. The non-volatile RAM 31b stores the operation condition information included in the control signal MRi in a corresponding register in accordance with the rewrite instruction signal RWS.

Figure 9:
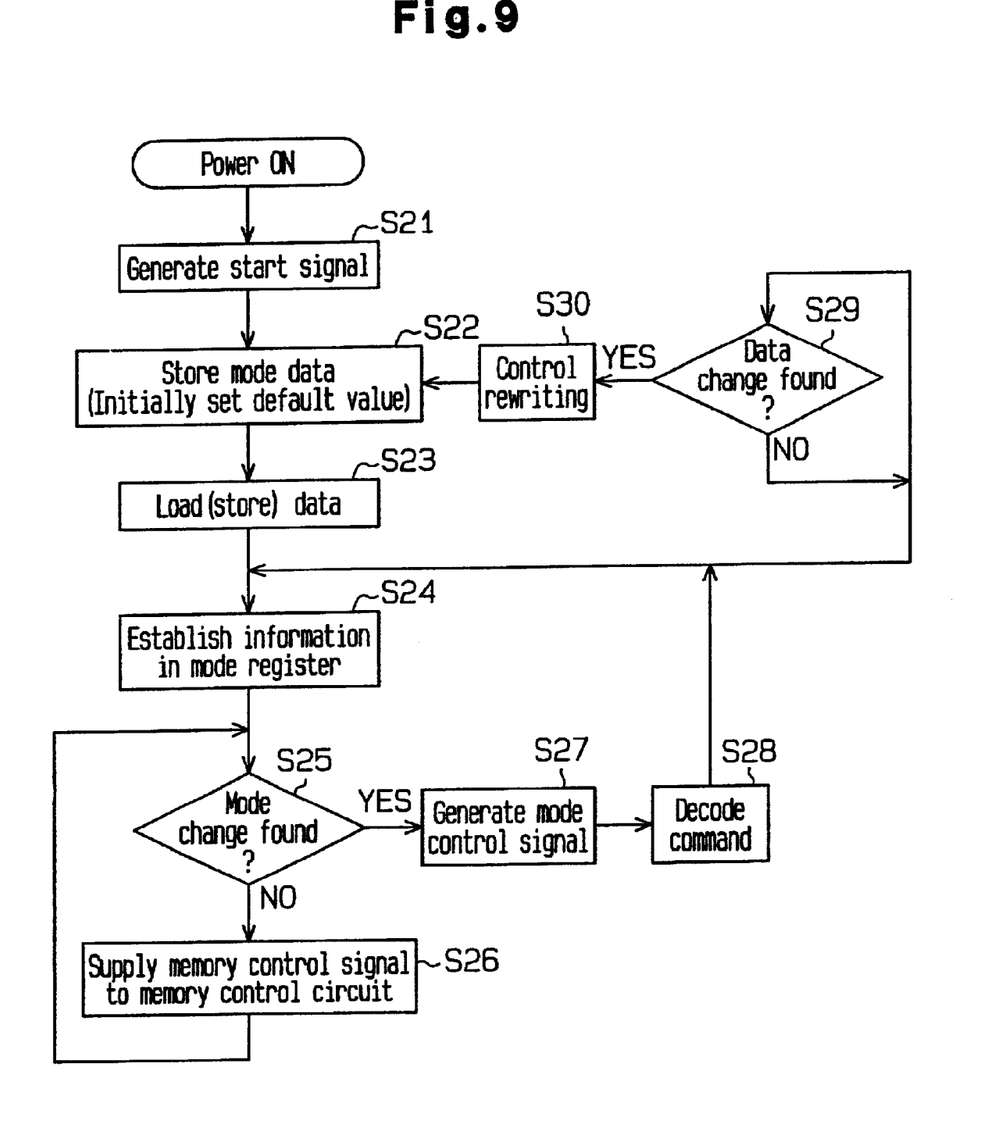
FIG. 9 is a diagram for explaining a sequence of operations performed by the semiconductor device in FIG. 8.

FIG. 9 is a diagram illustrating a sequence of operations in the second embodiment including the user's system.

As the device 30A is powered on, a start signal stt is generated within the device 30A (step S21), and the load register 31A transfers a default value to the mode register 32 in response to the start signal stt (step S22). The data (default value) is loaded into the mode register 32 (step S23) to establish initial operation condition information for the mode register 32 (step S24).

Next, it is determined whether the mode (operation condition information) has been changed (step S25). When the mode is not changed, a control signal MRi is supplied from the mode register 32 to the memory control circuit 33 (step 26). In response to the control signal MRi, the memory control circuit 33 operates, causing the device to perform an operation such as read/write.

Afterwards, the mode register 32 is rewritten by an MRS command for adapting the operational specification condition of the device to the system operational specifications of the user. When the operation condition information is changed, a mode control signal is generated (step S27) and received by the MRS control circuit 35. The MRS control circuit 35 decodes the mode control signal, and generates a set signal MRSi including operation condition information in accordance with the decoding. The set signal MRSi is supplied to the mode register 32 (step S28). Thus, new operation condition information is established in the mode register 32.

The MRi change detector 34A determines whether or not data in the mode register 32 has been changed based on the control signal MRi (step S29). When the data has been changed, the rewrite control circuit 31a of the load register 31A controls rewriting of the contents of the non-volatile RAM 31b in response to a detection signal MRiD of the MRi change detector 34A (step S30). As a result, the content of the non-volatile RAM 31b is replaced by the new operation condition information (step S22).

Subsequently, when the device 30A is again powered on, the new operation condition information is loaded into the mode register 32 from the load register 31A, and stored in the mode register 32. The memory control circuit 33 operates in accordance with the new operation condition information, causing the device 30A to perform an operation such as read/write.

When the content of the load register 31A is changed, an LRW command is generated in the system. It is determined that data in the mode register 32 is changed (step S29), and a rewrite instruction signal RWS is output from the rewrite control circuit 31a. The rewrite control circuit 31a has received information indicating that the data is changed, to the non-volatile RAM 31b (step S30), thereby rewriting the contents of the non-volatile RAM 31b. Therefore, when the device 30A is powered on at a later time, a new set value written into the non-volatile RAM 31b is loaded into the mode register 32, and the memory control circuit 33 operates in accordance with the set value, causing the device 30A to perform an operation such as read/write.

The semiconductor devices 30, 30A according to the first and second embodiments have the following advantages.

(1) The change detector 34 or 34A detects a change in the operation condition information for the semiconductor device 30 or 30A set in the mode register 32 based on a change in the device control signal MRi, and generates the detection signal MRiD. The load register 31 or 31A, in response to the detection signal MRiD, rewrites the stored operation condition information based on the device control signal MRi. Thus, information in the load register 31 is automatically changed only by changing the information in the mode register 32. As a result, the semiconductor devices 30, 30A can eliminate a labor of writing new information into the load register 31 or 31A, thereby facilitating the programming for the user system.

(2) When the semiconductor device 30 or 30A is powered on, the load register 31 or 31A loads the mode register 32 with information stored therein in response to the start signal stt. This results in the elimination of a labor of writing the operation condition information into the mode register 32 each time the system is started, and in a reduction in a start-up time of the system.

[Third Embodiment]

Figure 10:
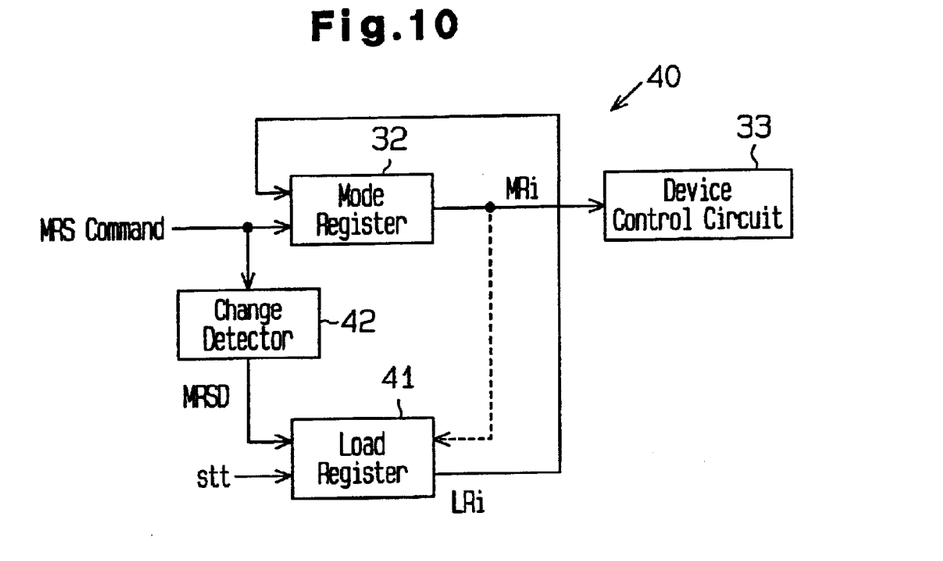
FIG. 10 is a schematic block circuit diagram of a semiconductor device according to a third embodiment of the present invention.

FIG. 10 is a schematic block circuit diagram of a semiconductor device 40 according to a third embodiment of the present invention. The semiconductor device 40 includes a load register 41, a mode register 32, a device control circuit 33, and a change detector 42.

The load register 41 includes a non-volatile RAM (not shown) which previously stored a variety of operation condition information (set values) suitable for the operational specifications of the semiconductor device 40. The load register 41 generates a load signal LRi including stored operation condition information in response to a start signal stt which is generated inside as the semiconductor device 40 is powered on. The load signal LRi is supplied to the mode register 32.

Specifically, the load register 41 and mode register 32 have a plurality of registers corresponding to the type (number) of the operation condition information. The load register 41 generates load signals LR1 to LR5 which include information corresponding to the respective registers, and supplies the load signal LR1 to LR5 to the mode register 32.

The mode register 32 stores information included in the transferred load signals LRi in the respective registers. The mode register 32 generates a device control signal MRi including the stored information (set value), and supplies the device control signal MRi to the device control circuit 33. The device control circuit 33, in response to the control signal MRi, controls, for example, an input/output circuit. The semiconductor device 40, operates in accordance with the operation condition information stored in the load register 41 when the semiconductor device 40 is powered on.

The operation condition information stored in the mode register 32 is changed by an MRS command from an external device. The mode register 32 receives the MRS command, and stores a set value added to the MRS command, or a set value based on another signal (address signal or the like) when the MRS command is received. The mode register 32 generates a device control signal MRi including changed operation condition information, and supplies the control signal MRi to the device control circuit 33. In this event, the semiconductor device 40 operates in accordance with the operation condition information (set value) newly set in the mode register 32.

The MRS command is supplied to the change detector 42. The change detector 42 monitors a change (rewriting) in the operation condition information stored in the mode register 32 based on the MRS command. Upon detection of a change in the operation condition information, the change detector 42 generates a detection signal MRSD which is supplied to the load register 41. The load register 41 stores the same information as the operation condition information in the mode register 32 in response to the detection signal MRSD.

[Fourth Embodiment]

Figure 11:
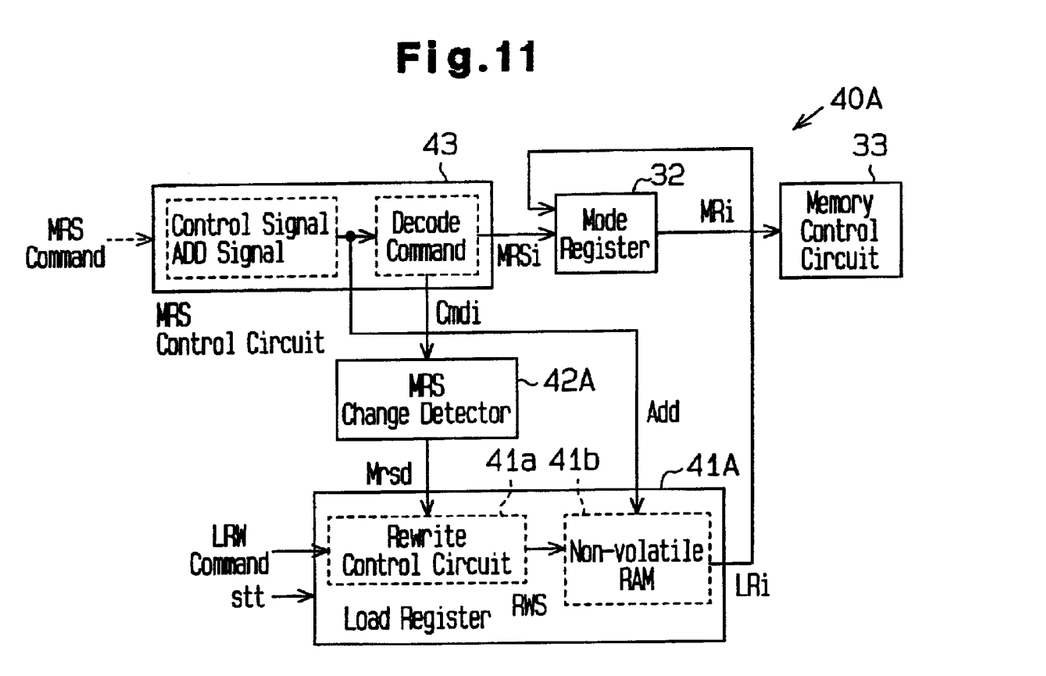
FIG. 11 is a schematic block circuit diagram of a semiconductor device according to a fourth embodiment of the present invention.

FIG. 11 is a schematic block circuit diagram of a semiconductor device 40A according to a fourth embodiment of the present invention. The semiconductor device 40A is a non-volatile semiconductor memory device such as an EEPROM or a flash memory. The semiconductor device 40A includes an MRS control circuit 43 in addition to the configuration of the semiconductor device 40 in the third embodiment.

The MRS control circuit 43 in the fourth embodiment differs from the MRS control circuit 35 in the second embodiment in the following points. The MRS control circuit 43 generates a command signal Cmdi indicative of a decoded command, and supplies the command signal Cmdi to an MRS change detector 42A. The MRS change detector 42A monitors the received command signal Cmdi for a change (change in the command). Upon detection of a change in the command signal Cmdi, the MRS change detector 42A generates a detection signal MRSD which is supplied to the load register 41A.

A load register 41A in the fourth embodiment includes a rewrite control circuit 41a and a non-volatile RAM 41b, and differs from the load register 31A in the second embodiment in the following points.

The load register 41A rewrites operation condition information stored in a non-volatile RAM 41b based on an address signal ADD when information in the mode register 32 is rewritten. The address signal ADD, which includes operation condition information for rewriting, is supplied to the MRS control circuit 43.

The rewrite control circuit 41a of the load register 41A generates a rewrite instruction signal RWS in response to a detection signal MRSD, and supplies the rewrite instruction signal RWS to the non-volatile RAM 41b. The non-volatile RAM 41b, in response to the rewrite instruction signal RWS, stores the same information as operation condition information set in the mode register 32 based on the address signal ADD.

Figure 12:
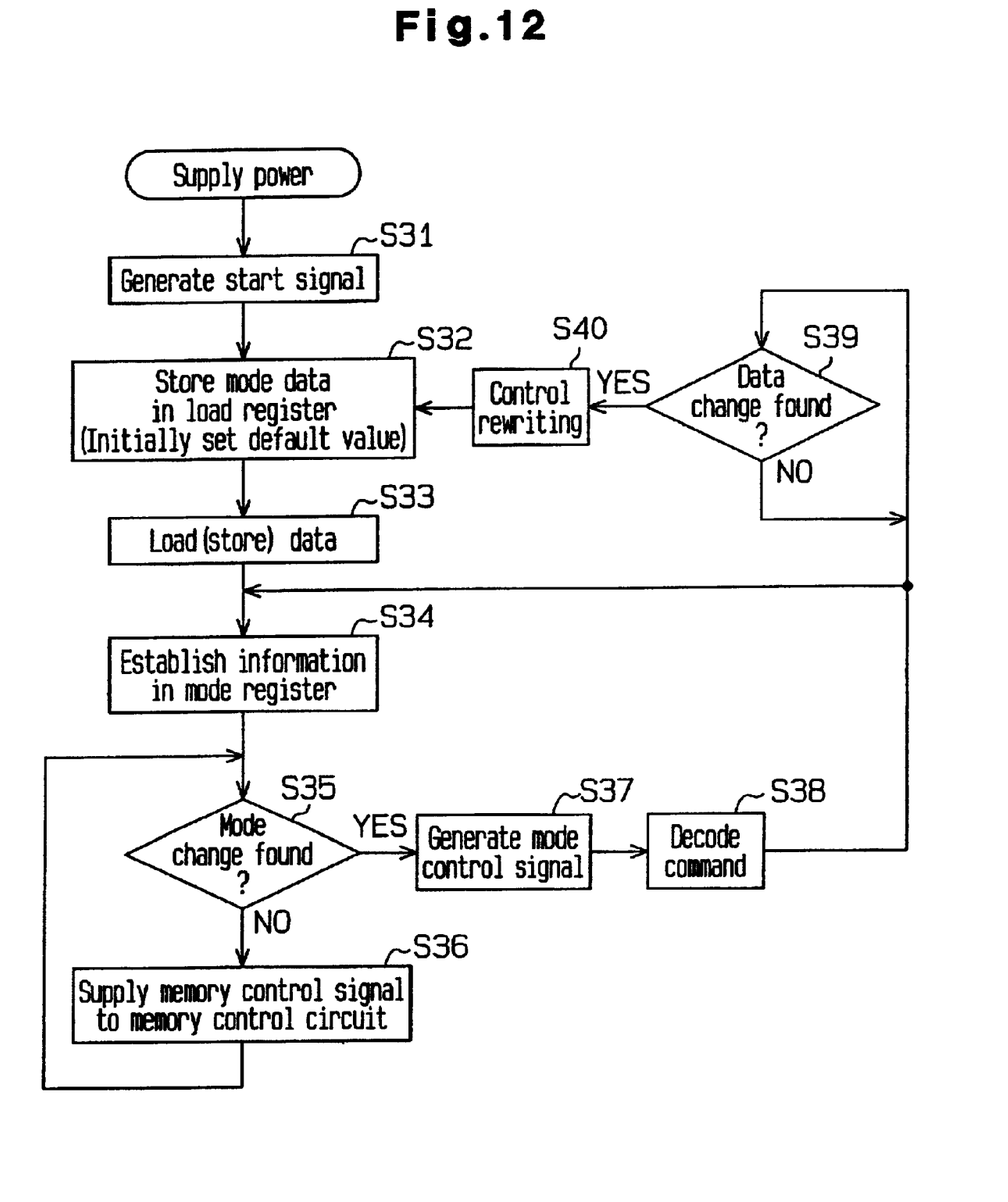
FIG. 12 is a diagram for explaining a sequence of operations performed by the semiconductor device in FIG. 11.

FIG. 12 is a diagram illustrating a sequence of operations in the fourth embodiment including the user's system.

As the device 40A is powered on, a start signal stt is generated within the device 40A (step S31). A default value has been set in the load register 41A (step 32). The mode register 32 is loaded with operation condition information in accordance with the default value (step S33) to establish information in the mode register 32 (step S34).

Next, it is determined whether or not the operation condition information (mode) stored in the mode register 32 is changed (step S35). When the mode is not changed, the mode register 32 supplies a device control signal MRi to the memory control circuit 33 (step S36). In response to the control signal MRi, the memory control circuit 33 operates, causing the device 40A to perform an operation such as read/write.

Afterwards, the operation condition information in the mode register 32 is rewritten in accordance with an MRS command for adapting the operational specification condition of the device to the system operational specification of the user. When the operation condition is changed, a mode control signal is generated (step S37), and the MRS control circuit 43 decodes a command (step S38).

When the decoded command is an MRS command, the MRS change detector 42A determines based on a command signal CMDI whether data in the mode register 32 has been changed (step S39). When the data has been changed, the MRS change detector 42A generates a detection signal MRSD which is supplied to the load register 41A. The rewrite control circuit 41a of the load register 41A controls rewriting of the non-volatile RAM 41b in accordance with a rewrite instruction signal RWS (step S40), to replace the data in the non-volatile RAM 41b with the operation condition information in the mode register 32 (step S32).

Afterwards, when the device 40A is once powered off and again powered on, the changed operation condition information in the load register 41A is loaded into the mode register 32 (step S33). When the operation condition information in the mode register 32 is changed, the load register 41A is automatically loaded with the same information as that in the mode register 32.

When an LRW command is generated in the system for changing the contents of the load register 41A, the load register 41A determines that the data is changed (step S39). In response to the LRW command, the rewrite control circuit 41a generates a rewrite instruction signal RWS including operation condition information to be rewritten, and supplies the rewrite command signal RWS to the non-volatile RAM 41b (step S40). The LRW command includes the operation condition information to be rewritten. Thus, when the device 40A is powered on at a later time, the mode register 32 is loaded with the new operation condition information written into the non-volatile RAM 41b, so that the memory control circuit 33 operates in accordance with the new information.

The fourth embodiment has the following advantages.

(1) The change detector 42A generates the detection signal MRSD based on a command for changing the mode (operation condition information) in the mode register 32, and supplies the detection signal MRSD to the load register 41A. The load register 41A, in response to the detection signal MRSD, rewrites information in the non-volatile RAM 41b based on the address signal including operation condition information to be changed. Thus, associated with a change in information stored in the mode register 32, information in the load register 41A is automatically changed to that in the mode register 32. As a result, it is possible to save the time of writing new information into the load register 41A, and facilitate programming of the user's system.

[Fifth Embodiment]

Figure 13:
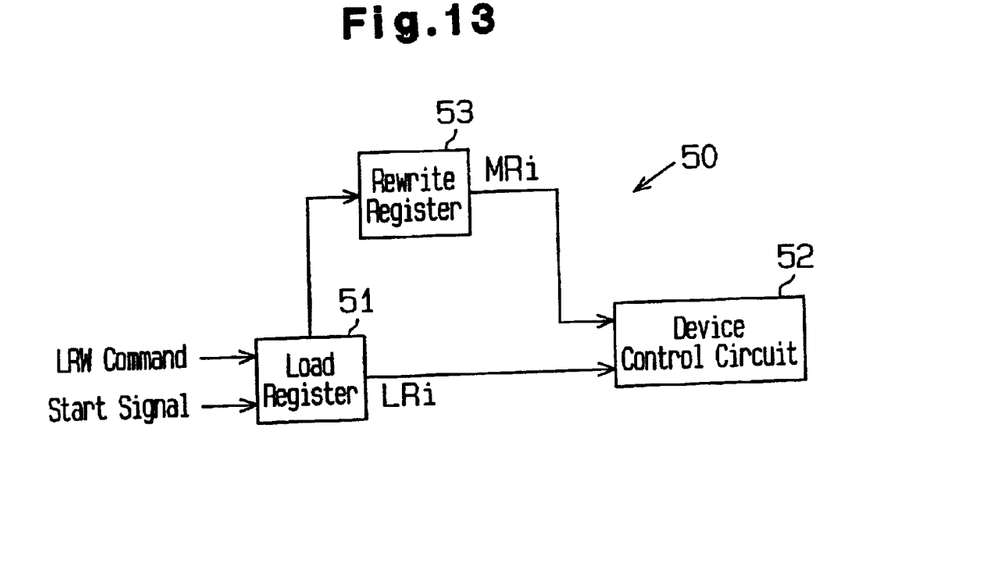
FIG. 13 is a schematic block circuit diagram of a semiconductor device according to a fifth embodiment of the present invention.

FIG. 13 is a schematic block circuit diagram of a semiconductor device 50 according to a fifth embodiment of the present invention. The semiconductor device 50 includes a load register 51, a device control circuit 52, and rewrite register 53.

The load register 51 includes a non-volatile RAM (not shown) which previously stored a variety of operation condition information (set values) suitable for the operational specifications of the semiconductor device 50. The load register 51 generates a first control signal LRi including the stored operation condition information, in response to a start signal stt which is generated within the device 50 when it is powered on. The first control signal LRi is supplied to the device control circuit 52. The device control circuit 52 has a latch function for holding the received operation condition information, and controls a peripheral circuit based on the held operation condition information.

The load register 51 receives an LRW command from an external device. The load register 51, in response to the LRW command, stores operation condition information added to the LRW command, or operation condition information based on another signal (for example, an address signal) when the LRW command is supplied.

The load register 51 further generates a rewrite instruction signal RWS including substantially the same information as the operation condition information stored therein, and supplies the rewrite instruction signal RWS to the rewrite register 53. The rewrite register 53 is a volatile RAM for storing the same operation condition information as that in the load register 51 based on the rewrite instruction signal RWS.

The rewrite register 53 generates a second control signal MRi including the stored operation condition information, and supplies the second control signal MRi to the device control circuit 52. The device control circuit 52 receives the second control signal MRi, and latches rewritten operation condition information. The device control circuit 52 controls a peripheral circuit based on the latched operation condition information.

Since the rewrite register 53 is a volatile RAM, the storage of a new set value is extremely rapidly completed, as compared with the load register 51 which includes a non-volatile RAM. For example, the rewrite register 53 requires a time on the order of nanoseconds (nS) for storing a set value therein, whereas the load register 51 requires a time on the order of microseconds ($\mu$S). Thus, the rewrite register 53 can generate the second control signal MRi in a short time from the time it is supplied with the LRW command, so that the semiconductor device 50 can operate in accordance with the new set value without delay from the receipt of the LRW command.

[Six Embodiment]

Figure 14:
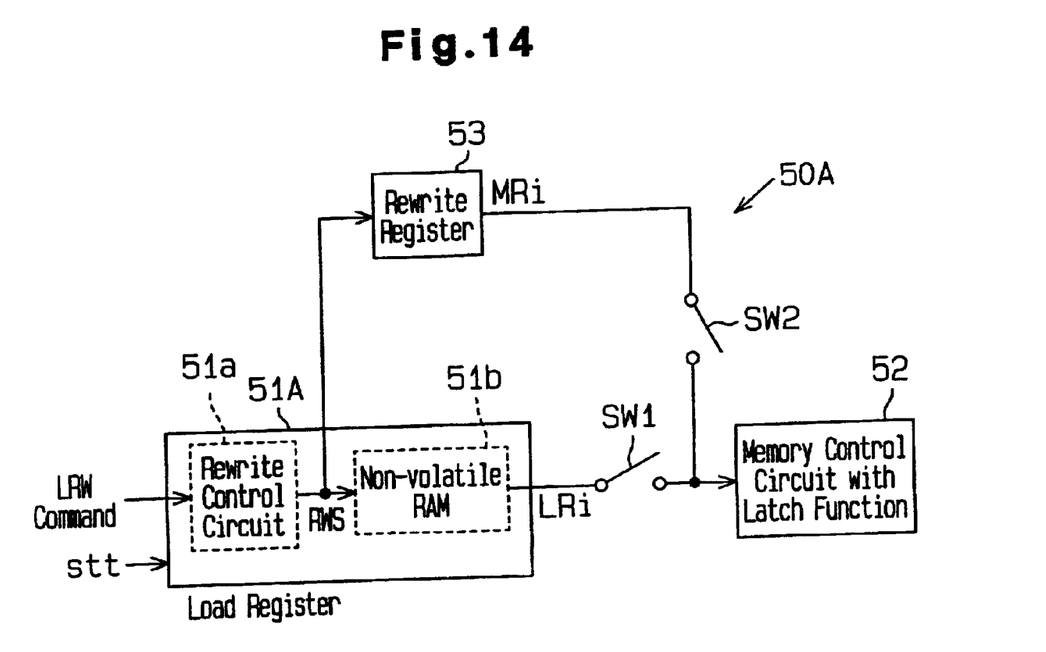
FIG. 14 is a schematic block circuit diagram of a semiconductor device according to a sixth embodiment of the present invention.

FIG. 14 is a schematic block circuit diagram of a semiconductor device 50A according to a sixth embodiment of the present invention. The semiconductor device 50A is a non-volatile semiconductor device, for example, an EEPROM or a flash memory. The semiconductor device 50A includes a load register 51A, a memory (device) control circuit 52, and a first and a second switch SW1, SW2.

The first switch SW1 is connected between the load register 51A and memory control circuit 52, while the second switch SW2 is connected between the rewrite register 53 and memory control circuit 52.

The load register 51A includes a rewrite control circuit 51a and a non-volatile RAM 51b. The load register 51A receives a start signal stt, and generates a first control signal LRi including a variety of operation condition information (set values) stored in the non-volatile RAM 51b in response to the start signal stt.

The rewrite control circuit 51a rewrites a set value in the non-volatile RAM 51b in response to an LRW command from an external device. The control circuit 51a, in response to the LRW command, generates a rewrite instruction signal RWS including operation condition information added to the LRW command, or operation condition information based on another signal (for example, an address signal) when the LRW command is supplied. The rewrite instruction signal RWS is supplied to the non-volatile RAM 51*b* and rewrite register 53.

The non-volatile RAM 51*b* stores new operation condition information based on the rewrite instruction signal RWS, and generates a first control signal LRi including this information. The first control signal LRi is supplied to the memory control circuit 52 through the first switch SW1.

The rewrite register 53 stores new operation condition information based on the rewrite instruction signal RWS, and generates a second control signal MRi including this information. The second control signal MRi is supplied to the memory control circuit 52 through the second switch SW2.

The first switch SW1 is normally off, and is turned on in response to the start signal stt. Thus, the memory control circuit 52 receives the first control signal LRi from the load register 51A in response to the start signal stt.

The second switch SW2 is normally off, and is turned on in response to the rewrite instruction signal RWS. Thus, the memory control circuit 52 receives the second control signal MRi from the rewrite register 53 in response to the rewrite instruction signal RWS.

Alternatively, the first and second switches SW1, SW2 may be complementarily turned on/off. In this case, when the device 50A is started and in a normal state, the memory control circuit 52 receives the first control signal LRi from the load register 51A through the first switch SW1. After rewriting operation condition information, the memory control circuit 52 receives the second control signal MRi from the rewrite register 53 through the second switch SW2. Thus, the latch function can be removed from the memory control circuit 52, resulting in a reduction in the circuit scale.

Alternatively, the first and second switches SW1, SW2 may be controlled on/off together by the start signal stt.

Further alternatively, the load register 51A may generate a write end signal for the non-volatile RAM 51*b*, and the load register 51A may turn on the first switch SW1 and turn off the second switch SW2 in response to the write end signal. Specifically, at the same time the storage of new condition information into the non-volatile RAM 51*b* is started in response to the LRW command, the new operation condition information is stored in the rewrite register 53 as well. While the non-volatile RAM 51*b* has the new information stored therein, the second switch SW2 is turned on and the first switch SW1 is turned off. In this event, the memory control circuit 52 operates in accordance with the second control signal MRi. As the writing into the non-volatile RAM 51*b* terminates, the first switch SW1 is turned on and the second switch SW2 is turned off. In this event, the memory control circuit 52 latches operation condition information based on the first control signal LRi, and operates in accordance with the latched information.

The first and second switches SW1, SW2 prevent a failure from occurring when no match is found in the first and second control signals LRi, MRi supplied to the memory control circuit 52. The first and second switches SW1, SW2 may be comprised, for example, of logical gate circuits. Alternatively, the memory circuit 52 may have a high impedance input terminal, so that the memory control circuit 52 may have the functions of the first and second switches SW1, SW2. Further, the first and second switches SW1, SW2 may be turned on together when a match is found in the first and second control signals LRi, MRi.

Figure 15:
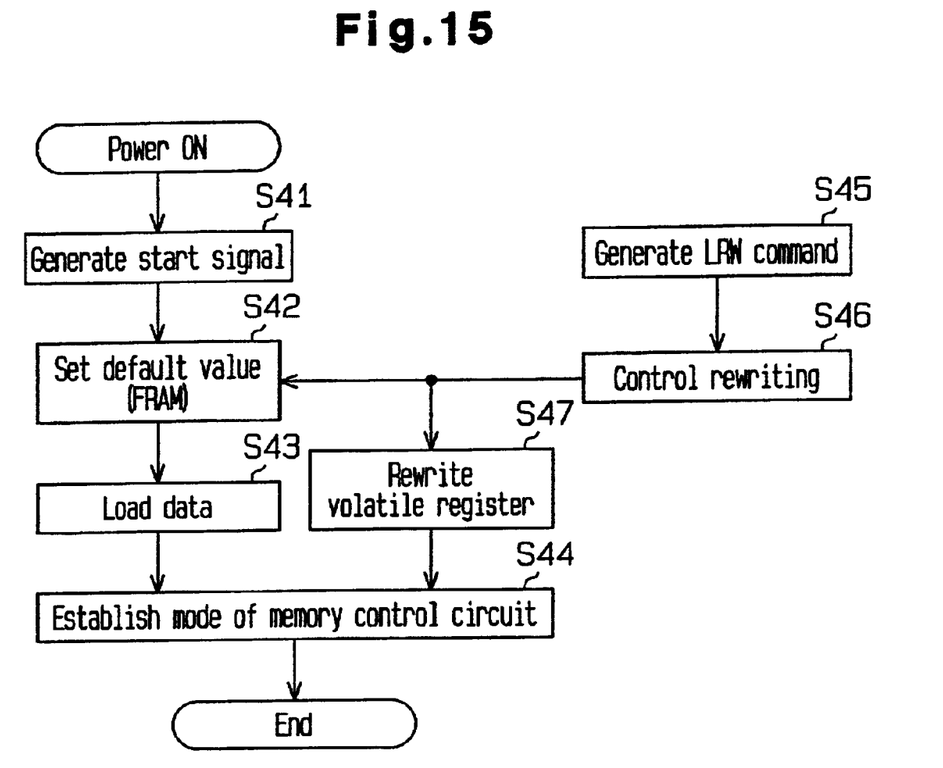
FIG. 15 is a diagram for explaining a sequence of operations performed by the semiconductor device in FIG. 14.

FIG. 15 is a diagram illustrating a sequence of operations in the sixth embodiment including the user's system.

As the device 50A is powered on, a start signal stt is generated within the device 50A (step S41), and the load register 51A sets mode information to a default value in response to the start signal stt (step S42). Next, the default value is loaded into the memory control circuit 52 (step S43) to establish an initial value for operation condition information of the memory control circuit 52 (step S44).

As an LRW command is generated by the system for changing the contents of the load register 51A (step S45), the rewrite control circuit 51*a* generates a rewrite instruction signal RWS including rewrite information in response to the LRW command (step S46). The rewrite instruction signal RWS is supplied to the non-volatile RAM 51*b* and rewrite register 53 to rewrite data in the non-volatile RAM 51*b* (step S42) and to rewrite data in the rewrite register 53 (step S47). New operation condition information is established in the memory control circuit 52 in accordance with the contents of the rewrite register 53 (step S44).

The semiconductor device 50A according to the sixth embodiment has the following advantages.

(1) The load register 51A supplies the rewrite register (volatile memory) 53 with the same operation condition information to be rewritten when operation condition information in the load register 51A itself is rewritten by an LRW command from an external device. The rewrite register 53 supplies the device control circuit 52 with the second control signal MRi including the operation condition information to be rewritten. Thus, the semiconductor device 50A can be operated based on the new operation condition information without generating the start signal stt. As a result, it is possible to reduce a time required for changing the system operation.

(2) A time required for rewriting information in the rewrite register (volatile memory) 53 is extremely shorter than that in the load register (non-volatile RAM) 51A. Thus, information can be loaded into the memory control circuit 52 in a shorter time than when new operation condition information is supplied from the non-volatile RAM 51*b* to the memory control circuit 52 in response to an LRW command. As a result, it is possible to reduce the time required for changing the system operation.

It should be apparent to those skilled in the art that the present invention may be embodied in many other specific forms without departing from the spirit or scope of the invention. Particularly, it should be understood that the invention may be embodied in the following forms.

In the first and second embodiments, when information set in one of the plurality of registers constituting the mode register 32 is changed, the change detector 34, 34A may supply the load register 31, 31A with a detection signal MRiD indicative of the changed register.

In the third and fourth embodiments, when information set in one of the plurality of registers constituting the mode register 32 is changed, the change detector 42, 42A may supply the load register 41, 41A with a detection signal MRSD indicative of the changed register.

In the fifth and sixth embodiments, when information set in one of the plurality of registers constituting the load register 51, 51A is changed, the load register 51, 51A may be controlled such that only the information in the changed register is stored in the rewrite register 53.

In the fourth embodiment, data in the mode register 32 may be automatically stored in the load register 41. In this case, for example, as indicated by dotted lines in FIG. 10, the load register 41A receives a control signal MRi from the mode register 32, and stores the same information as operation condition information (set value) in the mode register 32 based on the control signal MRi.

In the first through fourth embodiments, the load registers 31, 31A, 41, 41A may load operation condition information into the mode register 32 as the device is powered on, and also supply the device (memory) control circuit 33 with a control signal including the operation condition information. In this case, after the contents of the mode register 32 has been changed, the mode register 32 supplies the device control circuit 33 with the control signal MRi. Also, an output signal of either the load registers 31, 31A, 41, 41A or the mode register 32 may be selected, such that the selected output signal is supplied to the device control circuit 33 as a control signal including the operation condition information.

Therefore, the present examples and embodiments are to be considered as illustrative and not restrictive. Accordingly, the invention is not to be limited to the details given herein, but may be modified within the scope and equivalence of the appended claims.

What is claimed is:

1. A semiconductor device having a plurality of operation modes and adapted to operate in accordance with operation condition information which defines each operation mode, the semiconductor device comprising:
   a first register for storing first operation condition information;
   a second register connected to the first register for storing second operation condition information; and
   a device control circuit connected to the first register for controlling the operation of the semiconductor device in accordance with the first operation condition information or the second operation condition information,
   wherein when the first operation condition is changed, the second register receives a set signal including change information for changing the first operation condition information, and changes the second operation condition information to changed first operation condition information in accordance with the change information.

2. The semiconductor device according to claim 1, wherein:
   the first register includes a volatile memory, the volatile memory storing the first operation condition information; and
   the second register includes a non-volatile memory, the non-volatile memory storing the second operation condition information.

3. The semiconductor device according to claim 1, wherein:
   the semiconductor device generates a start signal for starting the device; and
   the second register receives the start signal, and loads the first register with the second operation condition information in response to the start signal.

4. A semiconductor device having a plurality of operation modes and adapted to operate in accordance with operation condition information which defines each operation mode, the device comprising:
   a first register for storing first operation condition information;
   a change detector connected to the first register for detecting a change in the first operation condition information stored in the first register to generate a detection signal in accordance with the detected change;
   a second register connected to the first register and the change detector for storing second operation condition information in response to the detection signal; and
   a device control circuit connected to the first register for controlling the operation of the semiconductor device in accordance with the first operation condition information or the second operation condition information,
   wherein the second register receives a second register change signal including change information for changing the first operation condition information, and changes the second operation condition information to changed first operation condition information in accordance with the change information in response to the detection signal.

5. The semiconductor device according to claim 4, wherein:
   the second register includes a rewrite control circuit for instructing rewriting of the second operation condition information in response to the detection signal.

6. The semiconductor device according to claim 5, wherein:
   the rewrite control circuit receives an external command for rewriting the second operation condition information, and instructs the rewriting in accordance with the external command.

7. The semiconductor device according to claim 4, wherein:
   the first register includes a volatile memory, the volatile memory storing the first operation condition information; and
   the second register memory includes a non-volatile memory, the non-volatile memory storing the second operation condition information.

8. The semiconductor device according to claim 4, wherein:
   the semiconductor device generates a start signal for starting the device; and
   the second register receives the start signal, and loads the first register with the second operation condition information in response to the start signal.

9. The semiconductor device according to claim 4, wherein:
   the first register receives a set signal including the change information, and changes the first operation condition information in accordance with the change information, the set signal being associated with the second register change signal; and
   the change detector generates the detection signal in accordance with a detected change in the first operation condition information stored in the first register.

10. The semiconductor device according to claim 9, wherein:
    the second register change signal comprises an address signal, which is supplied to the semiconductor device together with a control signal for decoding the plurality of operation modes.

11. The semiconductor device according to claim 4, wherein:
    the second register change signal comprises the device control signal;
    the first register receives a set signal including the change information and changes the first operation condition information in accordance with the change information, and the first register further generates a device control signal including the change information and supplies the device control signal to the second register; and the change detector generates the detection signal in accordance with a detected change in the first operation condition information stored in the first register.

12. The semiconductor device according to claim 4, wherein:

the second register change signal comprises the device control signal;

the first register receives a set signal including the change information, and changes the first operation condition information in accordance with the change information, and the first register further generates a device control signal including the change information and supplies the device control signal to the second register; and the change detector detects a change in the device control signal, and generates the detection signal in accordance with a detected change in the device control signal.

13. A semiconductor device having a plurality of operation modes and adapted to operate in accordance with operation condition information which defines each operation mode, the device comprising:

a first register including a volatile memory for storing first operation condition information;

a second register connected to the first register and including a non-volatile memory for storing second operation condition information; and a device control circuit connected to the first register and the second register for controlling the operation of the semiconductor device in accordance with the first operation condition information or the second operation condition information, wherein when the second operation condition information is changed, the second register changes the first operation condition information in the first register to changed second operation condition information substantially at the same time the second operation condition information is changed, in accordance with change information for changing the second operation condition information.

14. The semiconductor device according to claim 13, wherein:

the second register includes a rewrite control circuit for controlling rewriting of the second register in accordance with an external command for rewriting the second operation condition information, wherein the rewrite control circuit controls rewriting of the first register.

* * * * *